United States Patent Office 3,082,231
Patented Mar. 19, 1963

3,082,231
S-(10-PHENOXARSINYL) SULFONATES AND THIOSULFONATES
Joseph E. Dunbar, Midland, Mich., assignor to The Dow Chemical Company, Midland, Mich., a corporation of Delaware
No Drawing. Filed Dec. 22, 1961, Ser. No. 161,351
6 Claims. (Cl. 260—440)

The present invention is directed to S-(10-phenoxarsinyl) sulfonates and thiosulfonates corresponding to the formula

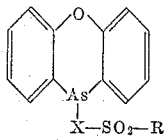

In this and succeeding formulae, R represents lower alkyl, phenyl, chlorophenyl, lower alkyl-phenyl or lower alkyl-chlorophenyl and X represents oxygen or sulfur. In the present specification and claims, the expression "lower alkyl" is employed to refer to radicals containing from 1 to 5 carbon atoms, inclusive. These compounds are crystalline solid materials which are somewhat soluble in many common organic solvents and of low solubility in water. The compounds are useful as parasiticides and herbicides and are adapted to be employed for the control of many plants, mites, insect, bacterial and fungal organisms such as worms, roaches, beetles, ascarids, millet and Cabomba.

The novel thiosulfonate compounds of the present invention are prepared by reacting a 10-halophenoxarsine with an alkali metal salt of a thiosulfonic acid corresponding to the formula Alkali metal—S—SO₂—R The reaction conveniently is carried out in an organic liquid such as acetone, acetone-water, benzene, toluene and nitromethane. The amounts of the reagents to be employed are not critical, some of the desired products being obtained when employing any proportion of the reagents. In the preferred method of operation, good results are obtained when employing substantially equimolecular proportions of the 10-halophenoxarsine and alkali metal compound. The reaction takes place smoothly at the temperature range of from 0° to 150° C. with the production of the desired product and halide of reaction. The halide appears in the reaction mixture as alkali metal halide. In carrying out the reaction, the reactants are mixed and contacted together in any convenient fashion and the resulting mixture maintained for a period of time in the reaction temperature range to insure completion of the reaction. Following the reaction, the reaction mixture is filtered and the filter cake washed with water to remove alkali metal halide and obtain the desired product as a residue. The solvent is then removed from the filtrate by evaporation to obtain any additional product. Such products may be combined and further purified by conventional procedures such as washing with water and dilute aqueous alkali metal hydroxides, solvent extraction and recrystallization.

The novel sulfonate compounds of the present invention are prepared by reacting 10,10'-oxybisphenoxarsine with a sulfonic acid corresponding to the formula

HO—SO₂—R

The reaction conveniently is carried out in an organic liquid such as benzene, xylene or toluene as reaction medium. The amount of the reagents to be employed is not critical, some of the desired product being obtained when employing any proportions. In the preferred method of operation, one molecular proportion of the 10,10'-oxybisphenoxarsine is reacted with about two molecular proportions of the sulfonic acid to obtain very desirable results. The reaction takes place smoothly at temperatures of from 0° to 150° C. with the production of the desired product and water of reaction. In carrying out the reaction, the reactants are mixed and contacted together in any convenient manner and the resulting mixture maintained for a period of time in the reaction temperature range to insure completion of the reaction. In a convenient method of operation, the reaction may be carried out at the boiling temperature of the reaction mixture and under reflux. Upon completion of the reaction, any reaction medium may be removed by evaporation or distillation to obtain the desired product as a solid residue. This product may be further purified by solvent extraction and recrystallization.

The following examples merely illustrate the invention and are not to be construed as limiting.

EXAMPLE 1

S-(10-Phenoxarsinyl) Methanethiosulfonate 10-chlorophenoxarsine (39.6 grams; 0.142 mole) was dispersed in 800 milliliters of acetone and the resulting mixture added rapidly to 23.9 grams (0.159 mole) of potassium methanethiosulfonate dispersed in a mixture of 50 milliliters of water and 700 milliliters of acetone. The addition was carried out at room temperature and stirring subsequently continued for 15 minutes to insure completion of the reaction. The reaction mixture was then filtered and the filter cake washed with water to obtain an S-(10-phenoxarsinyl) methanethiosulfonate product as a crystalline solid. This product was recrystallized from nitromethane and found to melt at 122.5°–125° C. and have carbon and arsenic contents of 44.03 percent and 21 percent, respectively, as compared to theoretical contents of 44.07 percent and 21.15 percent.

EXAMPLE 2

S-(10-Phenoxarsinyl) Ethanethiosulfonate 10-chlorophenoxarsine (41.7 grams; 0.15 mole) was dispersed in 500 milliliters of acetone and the resulting mixture added rapidly to 25.4 grams (0.155 mole) of potassium ethanethiosulfonate dispersed in a mixture of 15 milliliters of water and 500 milliliters of acetone. Stirring was thereafter continued and the mixture raised to the boiling point and maintained thereat for 5 minutes to insure completion of the reaction. The reaction mixture was thereafter filtered while hot, and the reaction medium removed from the filtrate by evaporation under vacuum to obtain an S-(10-phenoxarsinyl) ethanethiosulfonate product as a crystalline solid residue. This product was recrystallized from ethanol and found to melt at 116°–118° C. and to have carbon and arsenic contents of 45.69 percent and 20.34 percent, respectively, as compared to theoretical contents of 45.66 percent and 20.34 percent.

EXAMPLE 3

S-(10-phenoxarsinyl) Benzenethiosulfonate 10-chlorophenoxarsine (0.15 mole) was dispersed in 500 milliliters of acetone and added to 32.9 grams (0.155 mole) of potassium benzenethiosulfonate dispersed in 37 milliliters of water and 500 milliliters of acetone. The addition was carried out at room temperature and the mixture subsequently stirred for 15 minutes to insure completion of the reaction. The reaction mixture was thereafter filtered and the reaction medium removed from the filtrate by evaporation under vacuum to obtain an S-(10-phenoxarsinyl) benzenethiosulfonate product as a crystalline solid. This product was recrystallized from nitromethane and found to melt at 116.5°–119.5° C. and to have carbon and arsenic contents of 51.98 percent and 17.83 percent, respectively, as compared to theoretical contents of 52.18 percent and 18.08 percent.

EXAMPLE 4

S-(10-Phenoxarsinyl) 1-Butanethiosulfonate 10-chlorophenoxarsine (0.15 mole) was dispersed in 500 milliliters of acetone and this product admixed with 29.8 grams (0.155 mole) of potassium 1-butanethiosulfonate dispersed in 15 milliliters of water and 500 milliliters of acetone. The admixing of the materials was carried out at room temperature and stirring thereafter continued for about 15 minutes. The reaction mixture was thereafter processed as described in the preceding example to obtain an S-(10-phenoxarsinyl) 1-butanethiosulfonate product as a crystalline solid residue. This product was recrystallized from ethanol and found to melt at 88°–90° C. and to have carbon and sulfur contents of 48.66 percent and 16.52 percent, respectively, as compared to theoretical contents of 48.48 percent and 16.18 percent.

EXAMPLE 5

S-(10-Phenoxarsinyl) p-Toluenethiosulfonate 10-chlorophenoxarsine (0.142 mole) was dispersed in 450 milliliters of acetone and this mixture combined with 34.8 grams (0.154 mole) of potassium p-toluenethiosulfonate dispersed in 700 milliliters of acetone. The admixing was carried out at room temperature and the reaction mixture thereafter stirred for about 15 minutes to insure completion of the reaction. The reaction mixture was thereafter processed in the usual fashion to obtain an S-(10-phenoxarsinyl) p-toluenethiosulfonate product as a crystalline residue. This product was recrystallized from dimethylformamide and found to melt at 166°–168° C. and to have carbon and sulfur contents of 53.24 percent and 15.04 percent, respectively, as compared to theoretical contents of 53.03 percent and 14.90 percent.

EXAMPLE 6

10-Phenoxarsinyl Benzenesulfonate 10,10'-oxybisphenoxarsine (50.2 grams; 0.1 mole) and 35.2 grams (0.2 mole) of benzene sulfonic acid were dispersed in 600 milliliters of benzene and the resulting mixture heated for 4 hours with stirring at the boiling temperature and under reflux. During the heating, some of the reaction medium together with the water of reaction was continuously distilled out of the reaction zone, the water separated, and the reaction medium returned to the reaction mixture. Following the reaction, the reaction mixture was treated with activated charcoal, the treated mixture filtered and the filtrate allowed to cool to room temperature. During the cooling, a 10-phenoxarsinyl benzenesulfonate product crystallized in the mixture and was separated by filtration. This product melted at 160°–161° C. and had carbon and arsenic contents of 53.9 and 18.65 percent, respectively, as compared to theoretical contents of 54.01 and 18.72 percent.

EXAMPLE 7

10-Phenoxarsinyl Methanesulfonate 10,10'-oxybisphenoxarsine (0.1 mole) and 19.2 grams (0.2 mole) of methanesulfonic acid were dispersed in 600 milliliters of benzene and the resulting mixture heated with stirring for one hour at the boiling temperature and under reflux. During the heating, some of the benzene together with the water of reaction was distilled out of the reaction mixture as formed, the water separated and the benzene returned to the reaction zone. Following the reaction, the reaction mixture was treated with activated charcoal, the treated mixture filtered and the filtrate allowed to cool to room temperature. Following the cooling period, the reaction mixture was filtered to separate a 10-phenoxarsinyl methanesulfonate product as a crystalline solid melting at 159°–162° C. and having carbon and arsenic contents of 46.13 and 21.7 percent, respectively, as compared to theoretical contents of 46.17 and 22.15 percent.

EXAMPLE 8

10-Phenoxarsinyl-p-Chlorobenzenesulfonate 10,10'-oxybisphenoxarsine (0.1 mole) and 38.5 grams (0.2 mole) of p-chlorobenzenesulfonic acid were dispersed in 600 milliliters of benzene and the resulting mixture heated with stirring for two hours at the boiling temperature and under reflux. The heating was carried out in the manner as described in the preceding example. Following the reaction, the reaction mixture was also processed as described in the preceding example to obtain a 10-phenoxarsinyl p-chlorobenzenesulfonate product as a crystalline solid material. This product melted at 139°–140° C. and had carbon and arsenic contents of 49.83 and 17.23 percent, respectively, as compared to theoretical contents of 49.73 and 17.23 percent.

In a similar manner, other products of the present invention are prepared as follows:

S-(10-phenoxarsinyl) o-toluenethiosulfonate (molecular weight of 430) by reacting together 10-bromophenoxarsine and potassium o-toluenethiosulfonate.

S-(10 - phenoxarsinyl) 3',4' - dichlorobenzenethiosulfonate (molecular weight of 485) by reacting together 10-chlorophenoxarsine and sodium 3,4-dichlorobenzenethiosulfonate.

S-(10 - phenoxarsinyl) p - chlorobenzenetthiosulfonate (molecular weight of 450) by reacting together 10-chlorophenoxarsine and potassium p-chlorobenzenethiosulfonate.

S-(10-phenoxarsinyl) 2',4'-dibutylbenzenethiosulfonate (molecular weight of 538) by reacting together 10-chlorophenoxarsine and potassium 2,4-dibutylbenzenethiosulfonate.

S-(10-phenoxarsinyl) 2',4' - diethyl - 6'-methylthiobenzenesulfonate (molecular weight of 486) by reacting together 10-chlorophenoxarsine and potassium 2,4-diethyl-6-methylthiobenzenesulfonate.

10-phenoxarsinyl 2-amyl-benzenesulfonate (molecular weight of 470) by reacting together 10,10'-oxybisphenoxarsine and 2-amyl-benzenesulfonic acid.

10-phenoxarsinyl 4'-chloro-2'-methyl-benzenesulfonate (molecular weight of 448) by reacting together 10,10'-oxybisphenoxarsinyl and 4-chloro - 2 - methylbenzenesulfonic acid.

10 - phenoxarsinyl 2',4',6 ' -trichlorobenzenesulfonate, (molecular weight of, 503) by reacting together 10,10'-oxybisphenoxarsine and 2,4,6 - trichlorobenzenesulfonic acid.

10-phenoxarsinyl o-toluenesulfonate (melting at 159°–162° C). by reacting together 10,10-oxybisphenoxarsine and o-toluenesulfonic acid.

10-phenoxarsinyl 2,4-dimethylbenzenesulfonate (molecular weight of 428) by reacting together 10,10'-oxybisphenoxarsine and 2,4-dimethylsulfonic acid.

S - (10 - phenoxarsinyl) 4' - amylbenzenethiosulfonate (molecular weight of 486) by reacting together 10-chlorophenoxarsine and potassium 4-amylbenzenethiosulfonate.

S-(10-phenoxarsinyl) 2'-chloro-4',6' - dimethylbenzenethiosulfonate (molecular weight of 478) by reacting together 10-chlorophenoxarsine and potassium 2-chloro-4,6-dimethylbenzenethiosulfonate.

S - (10 - phenoxarsinyl) 2',4',5' - trichlorobenzenethiosulfonate (molecular weight of 519) by reacting together 10-chlorophenoxarsine and potassium 2,4,5-trichlorobenzenethiosulfonate.

S - (10 - phenoxarsinyl) 2',4',6' - trimethylbenzenethiosulfonate (molecular weight of 458) by reacting together 10-chlorophenoxarsine and potassium 2,4,5-trichlorobenzenethiosulfonate.

S-(10-phenoxarsinyl) 4'-chloro-2'-methylbenzenethiosulfonate (molecular weight of 464) by reacting together 10-chlorophenoxarsine and potassium 4-chloro-2-methylbenzenethiosulfonate.

The new compounds of the present invention are useful as herbicides and parasticides for the control of a number of plant and parasite species. For such use, the products are dispersed on a finely divided solid and employed as dusts. Also, such mixtures may be dispersed in water with or without the aid of a surface active dispersing agent and the resulting aqueous suspensions employed as sprays. In other procedures, the products are employed as toxic constituents in solvent solutions, oil-in-water or water-in-oil emulsions or aqueous dispersions. In representative operations, aqueous compositions containing 500 parts per million by weight of S-(10-phenoxarsinyl) toluenethiosulfonate give 100 percent kills of mites, Southern army worms and pigweeds. In further operations, the distribution of 10-phenoxarsinyl methanesulfonate in soil at the rate of 50 pounds per acre gives complete controls of millet.

The alkane and arenethiosulfonates employed as starting materials in accordance with the teachings of the present invention may be prepared in accordance with known methods. In a convenient method, potassium hydrosulfide (KSH) is reacted with an alkanesulfonyl halide or arenesulfonyl halide such as 2-chlorophenylsulfonyl chloride, pentachlorophenylsulfonyl bromide, 3,4-dichlorophenylsulfonyl bromide, 2,4,6-trialkylphenylsulfonyl chloride or 2-butyl-4-methylphenylsulfonyl chloride. In a convenient procedure, the reaction is carried out by adding the sulfonyl halide to an aqueous or alcoholic solution of potassium hydroxide saturated with $H_2S$. Upon completion of the reaction, the desired starting products are separated by conventional procedures. The arenesulfonyl halides are prepared in known methods and conveniently by the reaction of a suitable arene compound with chlorosulfonic acid. The arene sulfonyl halides can be readily hydrolyzed to obtain the corresponding acid compounds.

This is a continuation-in-part of my compending application Serial No. 114,309, filed June 2, 1961.

I claim:

1. A compound corresponding to the formula

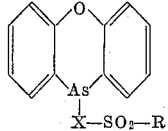

$$\text{X}-SO_2-R$$

wherein R represents a member of the group consisting of loweralkyl, phenyl, chlorophenyl, loweralkyl-phenyl, and loweralkyl-chlorophenyl, and X represents a member of the group consisting of oxygen and sulfur.

2. S-(10-phenoxarsinyl) methanethiosulfonate.
3. S-(10-phenoxarsinyl) ethanethiosulfonate.
4. S-(10-phenoxarsinyl) benzenethiosulfonate.
5. 10-phenoxarsinyl methanesulfonate.
6. S-(10-phenoxarsinyl) p-toluenethiosulfonate.

No references cited.